Feb. 13, 1940.     D. SENSAUD DE LAVAUD     2,189,976
ROTARY ENGINE
Filed Jan. 27, 1938     5 Sheets-Sheet 1

INVENTOR
DIMITRI SENSAUD DE LAVAUD
By: Hazeltine, Lake & Co.
ATTORNEYS.

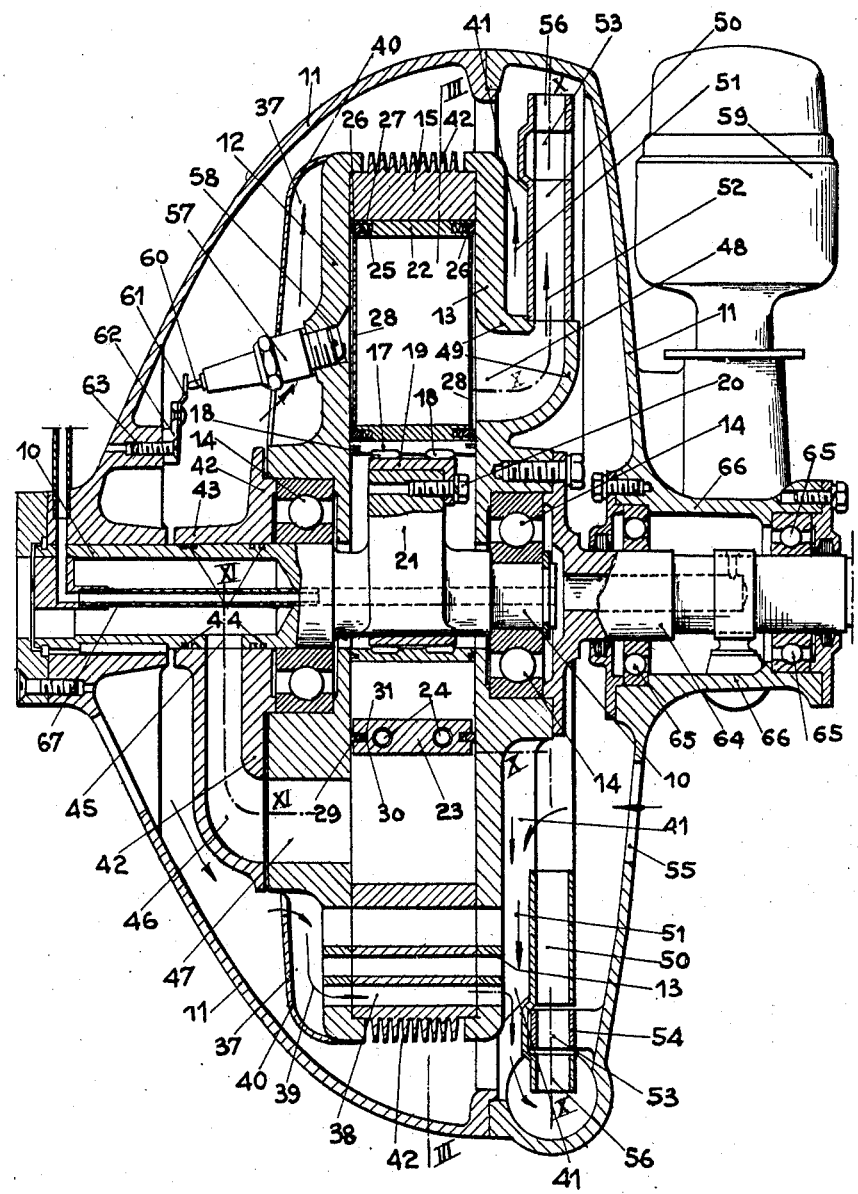

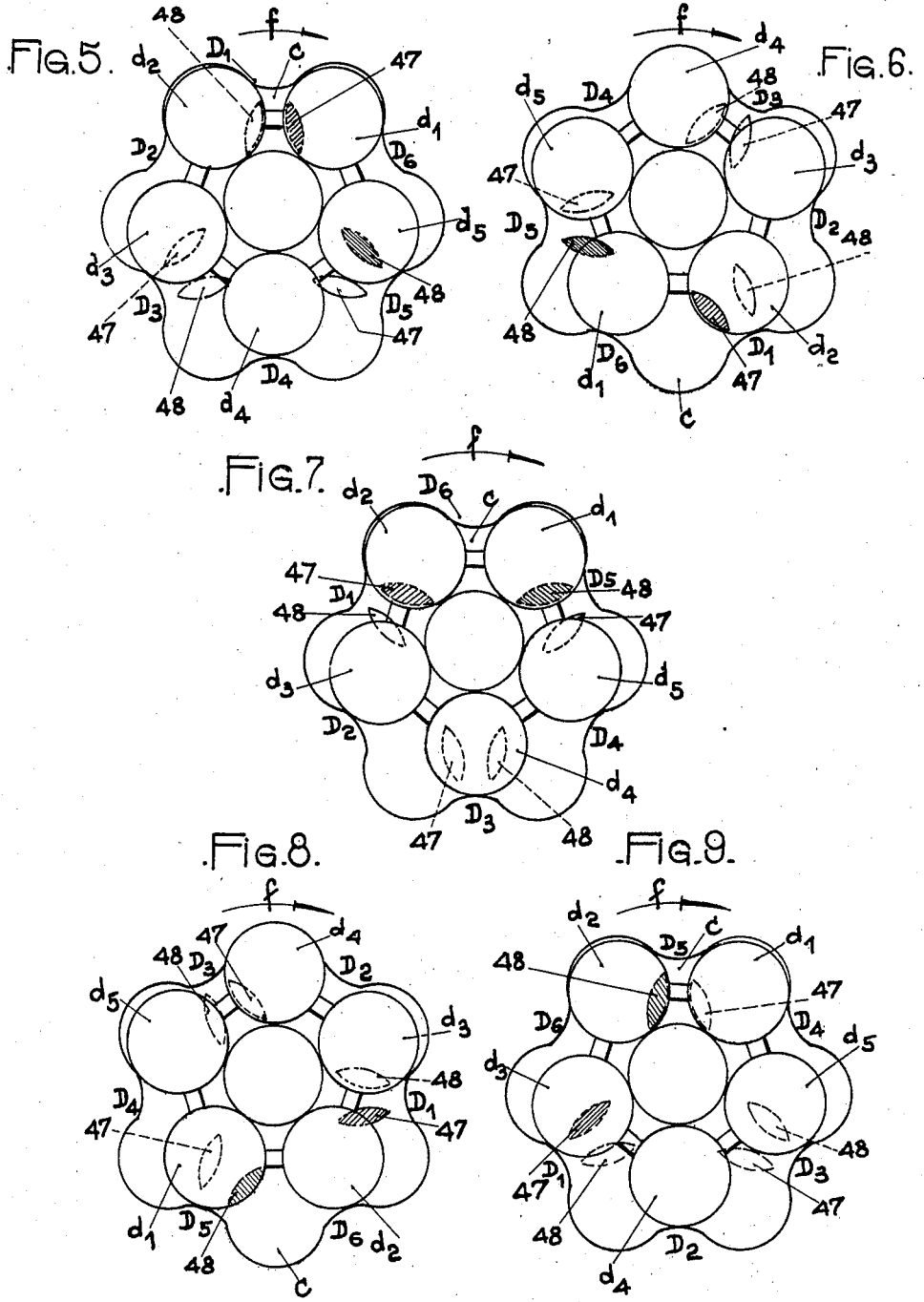

Feb. 13, 1940.  D. SENSAUD DE LAVAUD  2,189,976
ROTARY ENGINE
Filed Jan. 27, 1938  5 Sheets-Sheet 5
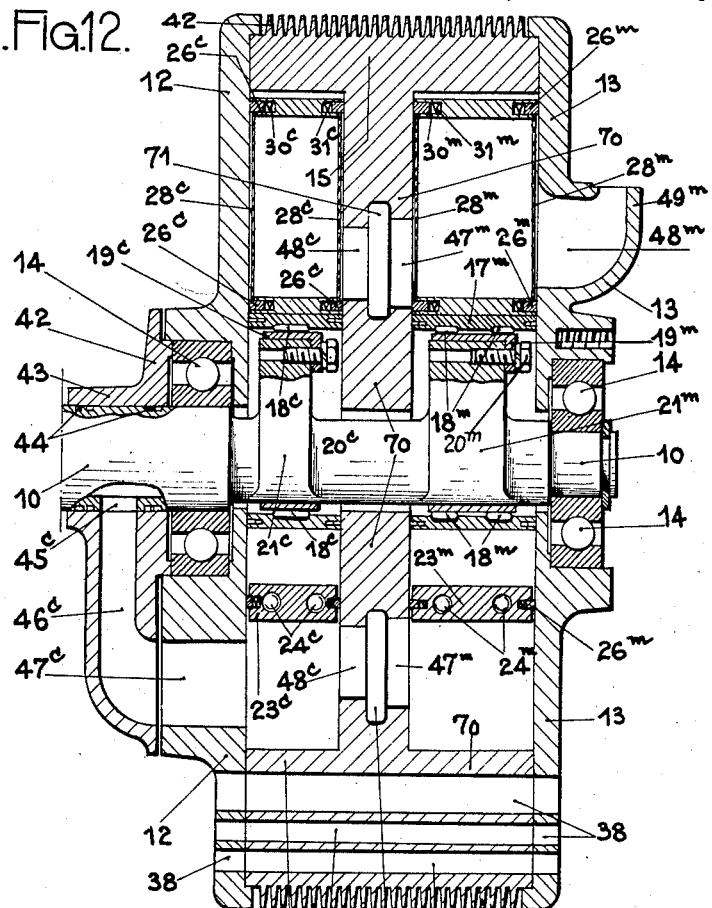
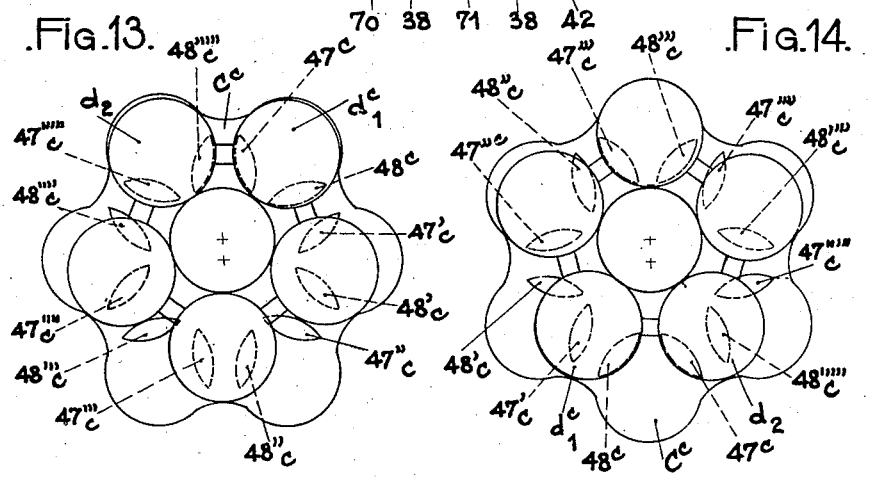
INVENTOR
DIMITRI SENSAUD DE LAVAUD
By: Haseltine, Lake & Co.
ATTORNEYS Patented Feb. 13, 1940

2,189,976

UNITED STATES PATENT OFFICE 2,189,976

ROTARY ENGINE

Dimitri Sensaud de Lavaud, Paris, France

Application January 27, 1938, Serial No. 187,140
In France January 27, 1937

7 Claims. (Cl. 123—12)

The present invention relates to improvements in rotary engines and compressors and is characterised in particular by the fact that the engine or the compressor comprises an inner toothed rotor meshing with an outer eccentric toothed rotor forming a case, the number of teeth of the outer rotor being one greater than the number of teeth of the inner rotor and the toothings being such that all the teeth of the inner rotor are in contact, along a generatrix, with the teeth of the outer rotor in such a manner that the chambers between two adjacent teeth of the inner rotor are fluid-tight.

By means of such an arrangement of the inner and outer rotors of the engine or the compressor, it will be seen that the relative speed between said two rotors is low and consequently less wear is caused and there is a possibility of causing each to rotate at a high absolute speed owing to the fact that they can be journalled on fixed parts which are placed suitably out of centre and are of relatively reduced diameter whereby a low circumferential speed is produced on the bearing surfaces and consequently very little wear.

Such a construction furthermore permits, owing to the fact that the spaces between the teeth provided in the outer rotor form the cylinders of the engine, an efficient cooling of said rotor.

The present invention also covers the combination, with such a rotary engine, of a gas turbine or the like which rotates with the outer rotor and into the blades of which are sent the burnt gases under pressure issuing from the exhaust of the rotary internal combustion engine.

The present invention also includes in its scope the combination, in the same unit, of an engine as indicated above with a rotary compressor which is constructed and operates in an identical manner.

The present invention also covers a number of particular points which will become apparent in the ensuing text taken with reference to the accompanying drawings which is given only by way of example and in which:

Fig. 2 is an axial section along line II—II—II of Fig. 3 of an embodiment of a rotary engine according to the present invention.

Fig. 5 shows diagrammatically the position of inlet and exhaust ports of the engine at the beginning of the intake, for one of the chambers of the engine.

Fig. 6 shows the inlet and exhaust ports at the end of the intake.

Fig. 7 shows the inlet and exhaust ports at the end of the compression.

Fig. 8 shows the inlet and exhaust ports at the end of the expansion or at the beginning of the exhaust.

Fig. 9 shows the inlet and exhaust ports at the end of the exhaust.

Fig. 12 is a similar section to that of Fig. 2, of a modified embodiment of a rotary engine combined according to the invention with a rotary compressor.

Fig. 13 shows diagrammatically the positions of the inlet and delivery ports of the compressor at the beginning of the intake for one of the chambers of said compressor.

Fig. 14 shows the same inlet and delivery ports at the end of the exhaust.

Figure 1:
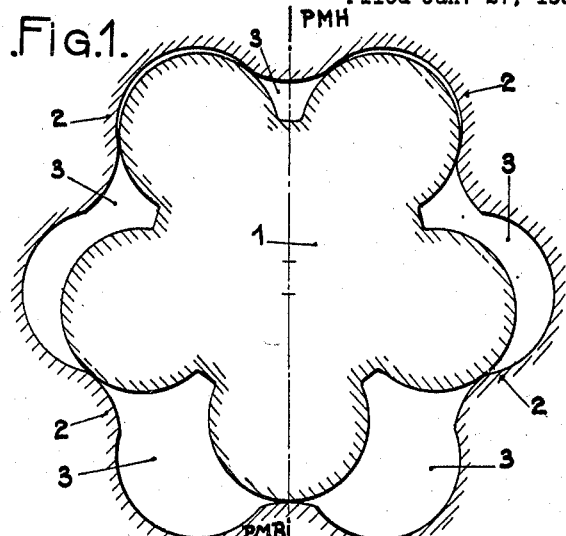
Fig. 1 is a diagrammatical view in section of the rotor of an engine or of a compressor constructed according to the invention.

In the various embodiments shown in the drawings, it has been assumed that the rotary internal combustion engine operates with a four-stroke cycle and is of the explosion type, but it is obvious that the invention is not limited to this type of engine but covers the other types such as two-stroke cycle engines, Diesel and semi-Diesel engines.

The diagrammatical embodiment illustrated in Fig. 1 shows in a very simplified manner the formation of a rotary engine or compressor constructed according to the invention. These two machines comprise in an identical manner a toothed inner rotor 1 meshing with an internally toothed eccentric outer rotor 2, the number of teeth of the outer rotor 2 being one greater than the number of teeth of the inner rotor 1 and the toothings of said rotors 1 and 2 being such that substantially all the teeth of the inner rotor 1 are in contact along at least one generatrix with the teeth of the outer rotor 2 so as to form, at each instant, a fluid-tight chamber between each group of two adjacent teeth of the inner rotor 1.

It will therefore be seen that if said rotors 1 and 2 rotate, the volume of said chambers varies at each instant starting from a minimum and reaching a maximum, these positions being located on the straight line PMH—PMB passing through the fixed centres of rotation of the outer rotor 2 and the inner rotor 1. Hereinafter said positions will be designated by the expression "extreme upper position" as regards the position where the volume of the chamber is at a minimum and by the expression "extreme lower position" as regards the position where the volume of the chamber is at a maximum.

The operation of the compressor will be readily understood from the foregoing. The intake is effected between the extreme upper position and the extreme lower position, that is to say during the period of increase of volume of the chamber 3 under consideration which is formed between two adjacent teeth of the inner rotor 1 and the intake is completed in the vicinity of the extreme lower position from which the compression starts owing to the fact that the volume of the chamber 3 between the two teeth in question of the inner rotor 1 progressively decreases. Said compression progressively increases up to the extreme upper position.

The engine is similar to the compressor, the minimum volume of the space 3 between two adjacent teeth of the inner rotor 1 is chosen, relatively to the maximum volume which said space 3 can attain, proportional to the degree of compression it is desired to obtain in said engine at the instant when the ignition takes place. The operation of said engine considered alone is as follows: It will be assumed that the teeth considered of the inner rotor 1 and the outer rotor 2 are in the extreme upper position, that is to say that the space or chamber between said teeth is at a minimum and has previously been filled with a suitable explosive mixture (air-petrol for example) which is thus compressed. If said mixture is ignited in a similar manner to that which occurs in an explosion engine cylinder, the pressure of said mixture increases abruptly and causes the inner rotor 1 and the outer rotor 2 to rotate so as to produce an increase of volume of the chamber 3 between the teeth under consideration; it is the power period of the cycle which, in the case of a four-stroke cycle, continues up to the vicinity of the extreme lower position where the volume of the chamber 3 under consideration is at a maximum.

Near this position begins the period of exhaust of the burnt gases which continues up to the vicinity of the extreme upper position where the volume of the chamber 3 under consideration is at a minimum. The period of intake of fresh cool gases then begins and continues up to the vicinity of the following extreme lower position from which begins the compression of the explosive mixture up to the vicinity of the following extreme upper position where the ignition of this compressed explosive mixture takes place. After which the cycle begins over again.

It will therefore be seen that in the case in which the engine operates with a four-stroke cycle, the accomplishment of a complete cycle takes place for a rotation of two revolutions of the inner rotor 1 and, consequently, for a rotation of $$\frac{2 \times 360°}{n+1}$$

of the outer rotor 2, $n$ designating the number of teeth of the inner rotor of the engine.

The embodiment shown in Figs. 2 to 11 of the drawings will now be described in greater detail.

On a fixed shaft 10, which is connected to the fixed frame or case 11 of the device by a key or the like, is journalled the outer rotor of the engine. Said outer rotor is formed by two lateral cheeks 12 and 13, respectively journalled on the fixed shaft 10 through the intermediary of ball bearings or the like 14 between which is fixed the cylindrical body 15 of the engine. Said cheeks 12 and 13 and the body 15 are connected together by any suitable means such as bolts 16. As stated above, the body 15 of the outer rotor carries on the inside a number of teeth and of recesses of suitable shape (six in the example shown) which are intended to co-operate with the recesses and the teeth of the inner rotor.

According to the invention, the inner rotor is formed by a sleeve 17 which is journalled, through the intermediary of needle bearings or the like 18, on a bearing bushing or ring 19 which is secured by any suitable means such as screws 20, to an eccentric 21 provided on the fixed shaft 10. On said ring 17 is mounted the inner rotor of the engine.

Said inner rotor is formed by a number of cylindrical tubes 22 which are equal in number to the number of teeth of the said inner rotor (five in the example shown).

Said cylindrical tubes 22 are connected together at the suitable distance apart by crosspieces 23 which are fixed to said tubes by screws 24. Said cross-pieces 23 limit, with the tubes or teeth 22 of the inner rotor and the teeth of the outer rotor, the various combustion chambers of the engine.

In order to permit, if desired, of the adjustment of the pressure of the teeth 22 of the inner rotor on certain of the teeth of the outer rotor, the bearing bushing 19 is slightly excentrated and can be adjusted in position, by any suitable means, on the eccentric 21 of the fixed shaft 10 after which it is held in place by the screw or screws 20 or the like.

To ensure the lateral fluid-tightness between the teeth or tubes 22 of the inner rotor and the cheeks 12 and 13 of the outer rotor, each tube 22 has, on each of its extreme lateral faces, a circular groove 25 in which engages a circular segment or ring 26 which is resiliently urged against the cheek 12 or 13 by any suitable means, such as one or a plurality of springs 27 arranged between the bottom of the groove 25 and the segment or ring 26.

The ends of the tubes 22 are closed by discs 28 made of sheet metal or the like which are fluidtightly connected, for example by welding, to the said tubes 22.

The lateral fluid-tightness between the crosspieces 23 of the inner rotor and the cheeks 12 and 13 of the outer rotor is ensured by bars 29 or the like which are engaged in corresponding grooves 30 provided in the ends of said crosspieces 23 and are resiliently urged by any suitable means such as springs 31 interposed between the bottom of the grooves 30 and the bars 29.

Figure 4:
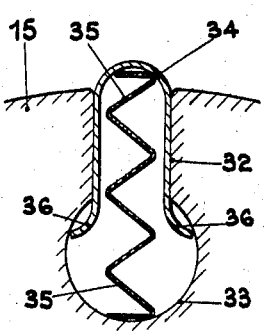
Fig. 4 is a detail view on a larger scale showing in transverse section an embodiment of one of the fluid-tight devices provided between the teeth of the inner and outer rotors.
Figure 3:
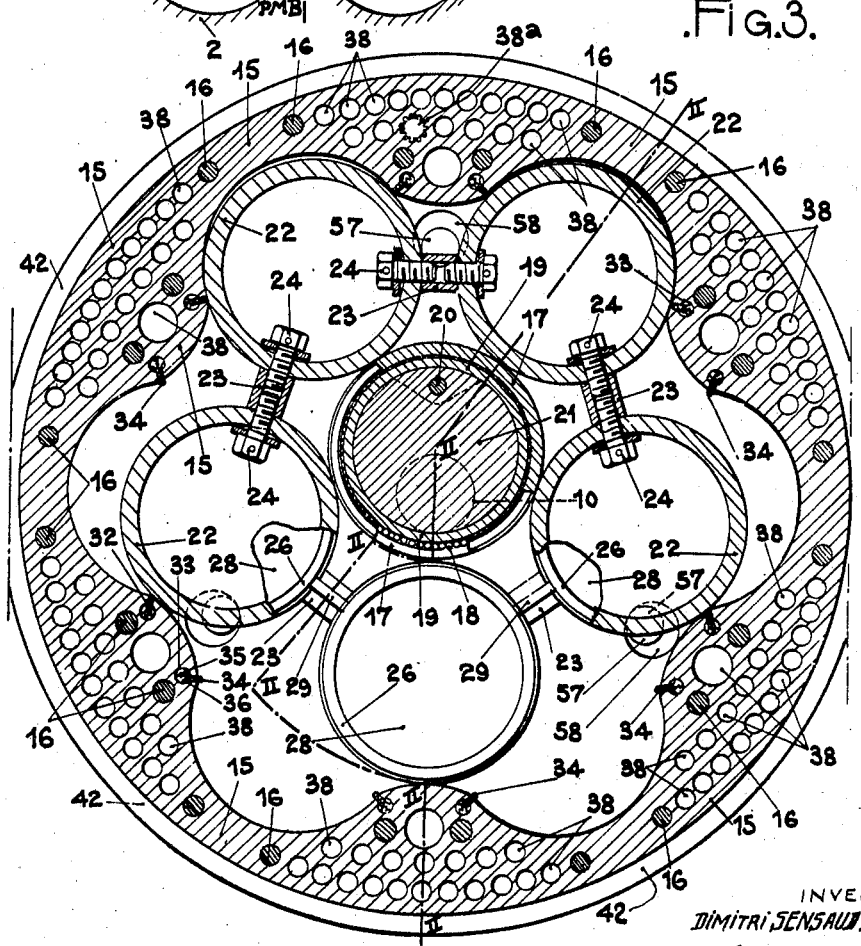
Fig. 3 is a sectional view of the rotors along the line III—III of Fig. 2, save for one of the teeth of the inner rotor which is assumed to be seen from its end.
Figure 10:
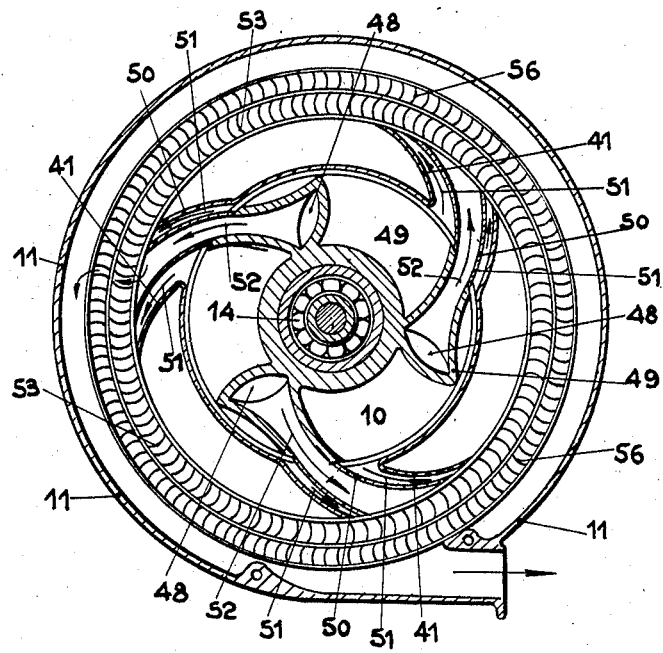
Fig. 10 is a diagrammatical section, on a smaller scale, along the line X—X of Fig. 2 showing more particularly the exhaust ports and pipes of the engine and also the blades of the turbine and of the intermediate ring for guiding the gaseous fluid.

It will also be understood that by construction there can be no hope of obtaining a simultaneous contact, along two substantially diametrally opposite lines, between each of the tubes or teeth 22 of the inner rotor and the flanks of the same recess of the outer rotor when the tooth 22 under consideration of the inner rotor is in the immediate vicinity of an extreme upper position. Now, it is indispensable, in order to prevent the communication between two adjacent chambers of the engine when the rotors are in this position, for these two contacts to be effected simultaneously. For this purpose and according to the invention, the outer rotor has, at each of the spots where the teeth of said rotor have to be in contact with the teeth 22 of the inner rotor when the latter is near its extreme upper position for the teeth under consideration, at least one transverse groove 32 which is substantially parallel with the axis of the fixed shaft 10 and of which the inner part is widened as shown at 33 (Fig. 4). Inside said groove is mounted a resilient bar 34 which has a U-shaped cross section and which is resiliently urged by a spring 35 from the bottom of the groove and brought into pressing contact with the tubes 22 forming the teeth of the inner rotor. In order to limit the displacement of the bars 34 and prevent them from coming out of their grooves 32 when there is no tooth of the inner rotor in contact with them, said bars 34 are slightly widened at the free end of their resilient arms and these widened parts 36 engage in the widened perforation 33 of the transverse grooves of the outer rotor.

In order to ensure a perfect cooling of the outer rotor, the invention also includes in its scope an air circulation device. Said device comprises lateral blades 37 fixed on the outer face of the lateral cheek 12 of the outer rotor. Said blades 37 are contained inside a case 40 which is in principle fluid-tight save that suitable perforations are provided for example in the central portion to permit the cooling air to enter the blades 37 of the centrifugal fan. At the peripheral portion, the central part 15 of the outer rotor has transverse perforations 38 in which the air sent by the blades 37 circulates. It will be understood that said air, which circulates in the direction of the arrows 39, produces the cooling of the outer rotor. In order to increase the area of contact of the rotor with the circulation air, the transverse perforations 38 may have an undulated periphery as shown at 38ᵃ in Fig. 3.

To further increase the cooling of the central part 15 of the outer rotor of the engine, said part 15 may have at its periphery, blades 42 as shown in particular in Fig. 2 of the drawings.

The inlet and exhaust means of the said engine will now be examined.

As regards the inlet, the fixed shaft 10 is tubular at its end which is connected to the case 11 so as to permit the fed of the combustible mixture which comprises, in the case illustrated, a mixture of air and petrol supplied by a carburettor or the like (not shown).

On the lateral cheek 12 of the outer rotor of the engine is fixed a part 42 having a hub 43 which rotates on the shaft 10 preferably without play in order to prevent any leak.

Furthermore, in order to procure perfect fluid-tightness between the shaft 10 and the hub 43, fluid-tight rings 44 of any suitable type are provided which are located on either side of a port 45 provided in the shaft 10. Opposite said port 45 and in the part 42 are are provided a number of passages or conduits 46 which open at their other end opposite ports 47 or inlet ports provided in the lateral cheek 12 of the outer rotor and which open inside the chambers of said rotor, as will be explained hereinafter.

The other lateral cheek 13 of the outer rotor has a number of ports 48 or exhaust ports to which are connected respectively exhaust tubes or conduits 49 provided on the cheek 13 and which can be cast integral with said cheek, as shown in particular in Fig. 2.

According to the invention, in order to utilise to the utmost the expansion of the burnt gases which are exhausted from the engine during the so-called exhaust period, a gas turbine operating by means of these exhaust gases is provided on the outer rotor of the engine. In the embodiment shown, said turbine is of the double stage type but it could obviously be of any other type and be formed for example by a simple gas vane wheel. The turbine shown in particular in Figs. 2 to 10 of the drawings has blades 50 which are fixed to the ends of the exhaust conduits 49. Said blades 50 have a suitable shape taking into account the direction of rotation *f* of the rotors of the engine and are remote from the outer face of the cheek 13 of the outer rotor so that they can be suitably cooled. For this purpose, the blades 41 which are suitably shaped and are described above are arranged between the cheek 13 and the blades 50 and cause, for example, an active centrifugal circulation of the air between said blades and the outer face of the cheek 13 as shown in particular in Fig. 2 of the drawings by the arrows 51.

Similarly, suitably directed blades 41 are provided between the blades 50 of the turbine for setting up an active centrifugal circulation of the air, in the direction of the arrows 51, between said blades 50 in which the exhaust gases of the engine circulate in the direction of the arrows 52.

Concentrically with the outlet of the blades 50 is provided, in the embodiment shown, a ring of fixed blades 53 mounted on a cheek 54 fixed to the frame 11 of the device by any suitable means. Said cheek 54 has central openings 55 to enable the cooling air circulating in the direction of the arrows, to be evacuated. In view of the fact that during the rotation of the engine, the exhaust of the gases of the engine is always effected at the same place relatively to the fixed frame, the fixed blades 53 may be provided only in the region where the exhaust of the burnt gases under pressure takes place.

Concentrically with the fixed blades 53 is arranged a ring of movable blades 56 fixed on the housing of the turbine on which are fixed the blades 50, that is to say that said blades 56 are secured to the lateral cheek 13 of the outer rotor of the engine. The blades 53 and 56 are suitably directed with respect to the blades 50 to produce a rotation of the outer rotor of the engine in the direction of the arrow *f*.

Such an arrangement enables the energy to be used which is contained in the burnt gases under pressure issuing from the exhaust of the engine. It will obviously be understood that the number of stages of the gas turbine could be increased without exceeding the scope of the present invention. Similarly, the exhaust of the burnt gases could be produced after a more or less prolonged expansion so that the energy utilised in the turbine would be greater or smaller.

The arrangement of the inlet ports 47 and of the exhaust ports 48 of said engine will now be examined and, for this purpose, reference will be had in particular to Figs. 5 to 9 of the drawings in which, for purposes of illustration, said ports 47 and 48 have been assumed to be arranged on the same side of the rotors, the teeth of which have been shown diagrammatically.

Figure 11:
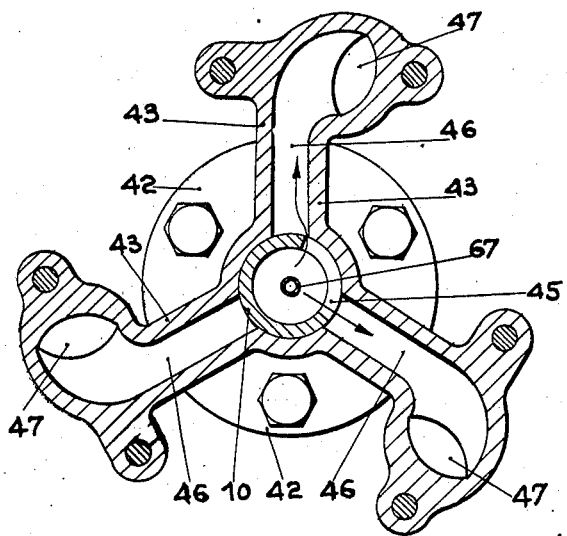
Fig. 11 is a detail diagrammatic section, on a smaller scale, along the line XI—XI of Fig. 2 showing more particularly the inlet ports and conduits of the engine.

To facilitate comprehension, the operation of the engine will be examined starting from the beginning of the intake period which corresponds, as stated above, to a position in which the chamber C considered, which is between two adjacent teeth $d_1$ and $d_2$ of the inner rotor, has its minimum volume. From this instant, the corresponding inlet port 47 in principle starts opening owing to the relative rotation between the inner and outer rotors at the same time as the conduit 46 corresponding to said port 47 comes into register with the port 45 provided in the fixed shaft 10 (Fig. 11). Then the intake continues for one half revolution of the inner rotor at the end of which the tooth $d_2$ of the inner rotor, which tooth is located immediately behind, in the direction $f$ of the rotation of the rotors, the tooth $d_1$ which has controlled the beginning of the opening of the inlet port 47, completely closes said inlet port 47 provided on the outer rotor. This takes place, as will be readily understood, when the inner rotor has rotated one half revolution. At the same time, the conduit 46 corresponding to the inlet port 47 under consideration, ceases to communicate with the port 45 provided in the fixed shaft 10 (Fig. 11).

The stroke for the compression of the gaseous mixture introduced into the engine then starts and continues in principle during a half revolution of the inner rotor, that is to say during a rotation of $$\frac{180°n}{n+1}$$

of the outer rotor of the engine a tooth which is then in an extreme upper position (Fig. 7). The inner rotor has therefore effected one revolution from the start, and has come into the position shown in Fig. 7. At this instant, the chamber C has a minimum value corresponding to the maximum compression of the gaseous mixture introduced into the chamber C which is limited by the teeth $d_2$ and $d_1$ of the inner rotor and the tooth $D_6$ of the outer rotor, that is to say by the tooth located immediately behind, relatively to the direction of rotation $f$ of the rotors, the tooth $D_1$ which, with the teeth $d_1$ and $d_2$ of the inner rotor, limited the chamber C initially considered at the beginning of the intake (Fig. 5). The explosive mixture thus compressed is then fired by any suitable means, such as a spark plug 57.

The pressure of said mixture then considerably increases and causes the rotors to rotate in the direction of the arrow $f$, this is the expansion period or power stroke. The volume of the chamber C increases until it reaches its maximum which is reached in the extreme lower position of the inner rotor (Fig. 8), said chamber being then limited by the teeth $d_1$ and $d_2$ of the inner rotor and the teeth $D_5$ and $D_6$ of the outer rotor.

In the vicinity of this point, the tooth $d_1$ starts uncovering the exhaust port 48 for the burnt gases and this opening continues during substantially a half revolution of the inner rotor until the latter reaches its extreme upper position in which the chamber C again has its minimum volume (Fig. 9) and is limited by the teeth $d_1$ and $d_2$ of the inner rotor and the tooth $D_5$ of the outer rotor.

In the vicinity of this point, the tooth $d_2$ of the inner rotor completely closes the exhaust port 47 (Fig. 9). The cycle of operation is then complete and continues as indicated above.

What has just been explained for the ports 47 and 48 would be repeated in an absolutely identical manner for the groups of ports 47' and 48' on the one hand, and 47" and 48" on the other hand.

The firing of the compressed explosive mixture is effected, in the example under consideration, by means of spark plugs 57 of the kind of those utilised in ordinary explosion engines. Said spark plugs 57 are screwed into perforations 58 provided on one of the lateral cheeks 12 or 13 of the outer rotor of the engine at suitable places, that is to say opposite which the compression of the air-petrol mixture takes place. Said spark plugs are supplied from a distributor 59 of any suitable type. In view of the fact that the firing of the compressed mixture is always effected at the same spot relatively to the fixed case 11 of the engine (that is to say in the extreme upper position of the inner and outer rotors of said engine), the current can be conveyed to the spark plug 57 by means of a friction contact. For this purpose, the electrode 60 of the spark plug 57 under consideration comes into contact, in the vicinity of the extreme upper position, with a resilient contact stud 61 which is fixed on an insulating part 62 itself fixed on the case 11 by means of screws 63 or the like. The stud 61 is connected, by a wire or the like, to the distributor 59.

As shown in particular in Fig. 2 of the drawings, the cheek 13 is secured to a shaft 64 which is co-axial with the fixed shaft 10 and is journalled through the intermediary of ball bearings 65 or the like 63, in a journal 66 of the fixed case 11.

The lubrication of the variatious members is effected, in the embodiment shown, by means of a lubricant under pressure supplied by a suitable source and conveyed by an axial pipe 67 provided inside the shaft 10.

The embodiment illustrated in Fig. 12 shows the combination in the same unit of a rotary compressor and a rotary engine constructed according to the invention. For this purpose, the outer rotor is common to the compressor and to the engine and the body 15 of said rotor has a central partition 70 separating the chambers of the engine and of the compressor. In this embodiment, the same members are designated by the same reference numerals as in the embodiment of Figs. 2 to 11 but are provided with the index $m$ when they relate to members of the engine and with the index $c$ when they relate to members of the compressor. In this drawing the fixed case and its associated members and also the turbine operating on the exhaust gases have not been shown, these devices remaining in principle the same as in the embodiment of Figs. 2 to 11.

The delivery orifices $48c$ of the compressor are provided in the medial partition 70 and open into a toric inner chamber 71 into which open, on the other hand, the inlet orifices or ports $47^m$ of the engine. It will therefore be understood that the air-petrol mixture which is compressed in said chamber 71 by the compressor is introduced into the engine.

The compression of said mixture is determined by the ratio of the volumes of the chambers of the compressor and of the engine taking into account the fact that, in the embodiment shown, each chamber of the compressor is filled and emptied at each revolution of the inner rotor of the latter, whereas a chamber of the engine is only supplied once every two revolutions of the inner rotor of the engine.

The arrangement of the delivery orifices 48c and of the inlet orifices 47c of the compressor will now be described in particular with reference to Figs. 13 and 14 of the drawings which show the position of a group of these ports at the beginning of the intake and at the end of the exhaust in Fig. 13 and at the end of the intake and at the beginning of the exhaust in Fig. 14.

At the beginning of the intake, the chamber $C^c$ has its minimum volume (Fig. 13) and the tooth $d^c{}_1$ of the inner rotor of the compressor begins to uncover the inlet port 47c at the same time as the conduit 46c corresponding to said inlet port 47c comes into register with the port 45c provided in the fixed shaft 10. Then the intake continues during substantially one half revolution of the inner rotor of the compressor at the end of which the tooth $d^c{}_2$ of the inner rotor, which tooth is located immediately behind, in the direction of rotation $f$ of the rotors, the tooth $d^c{}_1$ which has controlled the beginning of the opening of the inlet port 47c, completely closes said inlet port 47c provided in the cheek 12 of the outer rotor which is common to the engine and to the compressor (Fig. 13). At the same time, the conduit 46c corresponding to the inlet port 47c under consideration, ceases to communicate with the port 45c provided in the fixed shaft 10.

The chamber $C^c$ then has its maximum volume and the delivery stroke can begin. For this purpose, the tooth $d^c{}_1$ of the inner rotor of the compressor begins to uncover the exhaust or delivery port 48c of the compressor (Fig. 14) and the delivery continues during substantially one half revolution of the inner rotor of the compressor. At this instant, the tooth $d^c{}_2$ of said rotor closes the port 48c (Fig. 13). It can be seen that the complete cycle is effected for a rotation of one revolution of the inner rotor of the compressor, that is to say for a rotation of $$\frac{360°n}{n+1}$$

of the outer rotor of the latter, $n$ being the number of teeth of the inner rotor.

According to the invention, the inlet port 47c and the exhaust port 48c are so arranged and shaped that their opening and their closing by the teeth of the inner rotor is effected over their entire length by the edge of the tooth under consideration of said inner rotor.

The same operation takes place for the other groups of delivery and inlet ports controlling the other chambers of said compressor. As regards the engine, the operation remains identical to that described with reference to Figs. 2 to 11 of the drawings, save that the intake is effected from the gaseous mixture compressed in the chamber 71.

It is obvious that the invention is not limited to the embodiments hereinbefore described and illustrated, but covers all those which embody the features hereinbefore set forth and which fulfil the purpose aimed at. Thus, in particular, the compressor may be used alone. Similarly, the engine may be constructed to operate as a steam engine or as an internal combustion engine having a two-stroke cycle, or having the Diesel cycle.

What I claim as my invention and desire to secure by Letters Patent is:

1. In a rotary machine, an inner rotor which is toothed at its periphery, an internally toothed outer rotor meshing with said inner rotor and eccentrically mounted relatively to same, two lateral cheeks secured to said outer rotor and contacting with the lateral faces of said inner rotor so that said outer rotor forms a case, the number of teeth of the outer rotor being one greater than the number of teeth of the inner rotor and the toothings of said rotors being such that all the teeth of the inner rotor are in contact along a generatrix with the teeth of the outer rotor so that the chambers formed between two adjacent teeth of the inner roor are fluid-tight and have a volume which varies with the relative angular positions of the rotors, one of the cheeks of the outer rotor having a first series of ports whereas the other cheek of the outer rotor has a second series of ports, said ports being arranged on the cheeks in such a manner as to be uncovered during certain periods in order to enable, as regards the first series of ports, the intake to be effected in the chambers and, as regards the second series of ports, the exhaust to be effected from said chambers.

2. In a rotary machine, an inner rotor which is toothed at its periphery, an internally toothed outer rotor meshing with said inner rotor and eccentrically mounted relatively to same, two lateral cheeks secured to said outer rotor and contacting with the lateral faces of said inner rotor so that said outer rotor forms a case, the number of teeth of the outer rotor being one greater than the number of teeth of the inner rotor and the toothings of said rotors being such that all the teeth of the inner rotor are in contact along a generatrix with the teeth of the outer rotor so that the chambers formed between two adjacent teeth of the inner rotor are fluid-tight and have a volume which varies with the relative angular positions of the rotors, one of the cheeks of the outer rotor having a first series of ports whereas the other cheek of the outer rotor has a second series of ports, said ports being arranged on the cheeks in such a manner as to be uncovered during certain periods in order to enable, as regards the first series of ports, the intake to be effected in the chambers and, as regards the second series of ports, the exhaust to be effected from said chambers, the periods during which said ports are open or closed being such that said machine operates as a four-stroke cycle engine, means being provided for supplying the ports of the first series with a carburetted fuel mixture and other means are also provided for enabling said mixture to be fired when it is compressed substantially to its maximum degree in each chamber.

3. In a rotary machine, as specified in claim 2, the amplitudes of the various strokes are all equal substantially to a half-revolution of the inner rotor of the engine.

4. In a rotary machine or a compressor, an inner rotor which is toothed at its periphery, an internally toothed outer rotor meshing with said inner rotor and eccentrically mounted relatively to same, two lateral cheeks secured to said outer rotor and contacting with the lateral faces of said inner rotor so that said outer rotor forms a case, the number of teeth of the outer rotor being one greater than the number of teeth of the inner rotor and the toothings of said rotors being such that all the teeth of the inner rotor are in contact along a generatrix with the teeth of the outer rotor so that the chambers formed between two adjacent teeth of the inner rotor are fluid-tight and have a volume which varies with the relative angular positions of the rotors, one of the cheeks of the outer rotor having a first series of ports whereas the other cheek of the outer rotor has a second series of ports, said ports being arranged on the cheeks in such a manner as to be uncovered during certain periods in order to enable, as regards the first series of ports, the intake to be effected in the chambers and, as regards the second series of ports, the exhaust to be effected from said chambers, means being provided for ensuring the lateral fluid-tightness of each tooth of the inner rotor against the cheeks of the outer rotor and means being also provided for ensuring the fluid-tightness between each tooth of the inner rotor and the corresponding teeth of the outer rotor.

5. In a rotary apparatus which is utilisable as an engine or a compressor as specified in claim 4, the means for ensuring the lateral fluid-tightness of each tooth of the inner rotor and for ensuring the fluid-tightness of the contacts between the teeth of said rotors, comprise parts which are subjected to the action of springs.

6. In a rotary machine, an inner rotor which is toothed at its periphery, an internally toothed outer rotor meshing with said inner rotor and eccentrically mounted relatively to same, the number of teeth of the outer rotor being one greater than the number of teeth of the inner rotor and the toothings of said rotors being such that all the teeth of the inner rotor are in contact along a generatrix with the teeth of the outer rotor, transverse tubes for forming the teeth of the inner rotor means for closing ends of the said tubular teeth, cross-pieces for connecting said tubes to each other, two lateral cheeks secured to said outer rotor for limiting with the latter a space in which said inner rotor moves, one of said cheeks being provided with a series of ports, the other with another series of ports, said ports being arranged in such a manner as to be uncovered during certain periods by the teeth of the inner rotor in order to enable, as regards the first series of ports, the intake to be effected in the chambers and, as regards the second series of ports, the exhaust to be effected from said chambers, the outer rotor being provided with transverse ports, means for causing air to circulate in said transverse ports for cooling said outer rotor, and means for supplying carburetted fuel mixture to said chambers through said ports of the first series.

7. In a rotary machine, as specified in claim 4, the fluid-tight means, for preventing any communication between two adjacent chambers which are limited by the teeth of the outer and inner rotors, in particular in the vicinity of the position in which said chambers have their minimum volume, comprising bars which are resiliently urged into contact with the corresponding teeth of the inner rotor, the radial movement of said bars being limited.

DIMITRI SENSAUD DE LAVAUD.